United States Patent
Lin et al.

(10) Patent No.: US 9,547,127 B1
(45) Date of Patent: *Jan. 17, 2017

(54) BROADBAND SILICON NITRIDE POLARIZATION BEAM SPLITTER

(71) Applicant: INPHI CORPORATION, Santa Clara, CA (US)

(72) Inventors: Jie Lin, Santa Clara, CA (US); Masaki Kato, Palo Alto, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,658

(22) Filed: May 12, 2016

Related U.S. Application Data

(63) Continuation of application No. 14/935,356, filed on Nov. 6, 2015, now Pat. No. 9,366,818.

(51) Int. Cl.
| | |
|---|---|
| *G02B 6/126* | (2006.01) |
| *G02B 6/27* | (2006.01) |
| *G02B 6/28* | (2006.01) |
| G02B 6/12 | (2006.01) |

(52) U.S. Cl.
CPC .......... *G02B 6/126* (2013.01); *G02B 6/2773* (2013.01); *G02B 6/2804* (2013.01); *G02B 2006/1215* (2013.01); *G02B 2006/12035* (2013.01); *G02B 2006/12116* (2013.01); *G02B 2006/12147* (2013.01); *G02B 2006/12164* (2013.01)

(58) Field of Classification Search
CPC ..... G02B 6/126; G02B 6/2773; G02B 6/2804; G02B 2006/12147; G02B 2006/12164; G02B 2006/12116; G02B 2006/1215; G02B 2006/12035
See application file for complete search history.

(56) References Cited

U.S. PATENT DOCUMENTS

| | | | | |
|---|---|---|---|---|
| 7,356,206 | B2* | 4/2008 | Little | B82Y 20/00 385/11 |
| 9,366,818 | B1* | 6/2016 | Lin | G02B 6/2773 |
| 2014/0133793 | A1* | 5/2014 | Masaki | G02B 6/126 385/1 |

* cited by examiner

*Primary Examiner* — Ryan Lepisto
(74) *Attorney, Agent, or Firm* — Richard T. Ogawa; Ogawa P.C.

(57) ABSTRACT

A compact polarization beam splitter is formed by cascading two stages of directional couplers each containing two waveguides laid in parallel with a coupling gap. Each waveguide is made by silicon nitride material having a minimum length configured to be comparable with a coupling length for a TE polarization mode being set as twice of a coupling length for a TM polarization mode. A first-stage direction coupler is optimized by making the coupling gap smaller/greater than a nominal value to maximize TE/TM extinction ratio at least for a shorter/longer wavelength window of a designated wavelength band and each of two second-stage directional couplers is optimized by making the coupling gap greater/smaller than the nominal value to maximize TE/TM extinction ratio at least for a complementary longer/shorter wavelength window of the same designated wavelength band.

17 Claims, 4 Drawing Sheets

BROADBAND SILICON NITRIDE POLARIZATION BEAM SPLITTER

CROSS REFERENCE PARAGRAPH

The present application is a continuation of and claims priority to U.S. application Ser. No. 14/935,356 filed Nov. 6, 2015, now issued as U.S. Pat. No. 9,366,818, the contents of which are incorporated herein by reference.

BACKGROUND OF THE INVENTION

The present invention relates to a broadband communication device. More particularly, the present invention provides a broadband silicon nitride polarization beam splitter with low loss and high extinction ratio for entire C-band.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

As an important integrated optics device, a compact polarization beam splitter (PBS) can be used to achieve polarization independent operation of photonic integrated circuits (PICs) and linear optical quantum information technology. A perfect PBS should simultaneously have short device length, high extinction ratios, low insertion loss, broadband operation, stability, simple structure and high fabrication tolerances. The state-of-art designs for the PBS are mostly based on asymmetrical Mach-Zehnder interferometer (MZI), single directional coupler, Multimode interferometer (MMI), or surface plasmons waveguide. Although immense amount of concrete researches have been done, few perfect PBS has been reported and most of the designs mentioned above are either low in extinction ratio, difficult to manufacture, or wavelength-sensitive in C-band.

Therefore, it is desired to develop improved polarization beam splitter with high extinction ratio and low insertion loss over broad communication band.

BRIEF SUMMARY OF THE INVENTION

The present invention relates to photonic broadband communication device. More particularly, the present invention provides a broadband polarization beams splitter (PBS) based on silicon nitride waveguide. Merely by example, the present invention discloses a compact PBS using two-stage directional coupler with wider waveguides and complimentary designed gaps for achieving high extinction ratio and low insertion loss for integration in photonic integrated circuits (PIC) over C-band, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a polarization beam splitter. The polarization beam splitter includes a first-stage directional coupler comprising a first waveguide and a second waveguide laid in parallel with a first coupling gap and configured to have a coupling length for TE polarization mode be twice of that for TM polarization mode. The first waveguide is configured with an input port for receiving an optical signal over a predetermined wavelength band and a first through port for outputting a first primary TM mode portion of the optical signal with a first TM extinction ratio. The second waveguide is configured to have a first cross port for outputting a first primary TE mode portion of the optical signal cross coupled from the input port of the first waveguide with a first TE extinction ratio. The polarization beam splitter further includes a couple of second-stage directional couplers each being configured substantially same as the first-stage directional coupler except being complementary designed with a second coupling gap. A first second-stage directional coupler is cascaded to the first through port for further coupling the first primary TM mode portion to a second primary TM mode portion at a second through port with a second TM extinction ratio and a second second-stage directional coupler being cascaded to the first cross port for further cross-coupling the first primary TE mode portion to a second primary TE mode portion at a second cross port with a second TE extinction ratio. The first and second coupling gap are set complementary for maximizing the first and second TE/TM extinction ratio respectively within a shorter and longer wavelength window of the predetermined wavelength band or vise versa.

In an alternative embodiment, the present invention provides a method of manufacturing a compact polarization beam splitter. The method includes forming a first-stage directional coupler comprising two waveguides in parallel separated by a first gap. One of the two waveguides includes an input port and a first through output port. Another one of the two waveguides includes a first cross output port sided with the first through output port. Additionally, the method includes configuring each of the two waveguides such that a coupling length for a TE mode of an optical signal of any wavelength selected from a predetermined wavelength band received at the input port is twice of a coupling length for a TM mode of the optical signal. The method further includes setting the first gap to maximize transmission of a TE mode portion of the optical signal at the first cross output port and a TM mode portion at the first through output port at least within a shorter wavelength window of the predetermined wavelength band. Furthermore, the method includes forming a pair of second-stage directional couplers. Each contains two waveguides in parallel separated by a second gap and is configured to be substantially the same as the first-stage directional coupler. The method further includes cascading a first one of the pair of second-stage directional couplers to the first through output port for further coupling the TM mode portion to a second through output port and cascading a second one of the pair of second-stage directional couplers to the first cross output port for further coupling the TE mode portion to a second cross output port. Moreover, the method includes setting the second gap to be greater or smaller than the first gap to maximize transmission of the TE mode portion at the second cross output port and the TM mode portion at the second through output port at least within a longer wavelength window or a complementary shorter wavelength window of the predetermined wavelength band.

In a specific embodiment, the present invention provides a compact polarization beam splitter. The polarization beam splitter includes a first directional coupler comprising two waveguides in parallel separated by a first gap and configured to split an optical signal of a wavelength band received by an input port of one waveguide with a TE polarization mode portion being substantially cross-coupled once to a first cross output port of another waveguide while a TM polarization mode portion being substantially cross-coupled twice back to a first through output port of the same waveguide. Additionally, the polarization beam splitter includes a second directional coupler and a third directional coupler respectively cascaded to the first cross output port and the first through output port of the first directional coupler. Each of the second and third directional couplers includes two waveguides in parallel separated by a second gap greater than the first gap and configured to split TE and TM polarization mode the same way as the first directional coupler for further cross-coupling the TE polarization mode portion once to a second cross output port of the second directional coupler and cross-coupling the TM polarization mode portion twice to a second through output port of the third directional coupler. The first gap is set to maximize transmission of the TE/TM polarization mode portion respectively at the first cross/through output port at least over a shorter or longer wavelength window of the wavelength band and the second gap is set to maximize transmission of the TE/TM polarization mode portion respectively at the second cross/through output port at least over a complementary longer or shorter wavelength window of the wavelength band.

Many benefits of polarization beam splitting can be achieved with the present invention based on the waveguide-based directional couplers. Using SiN waveguide made by CMOS technology based on SOI wafer to replace typical Si waveguide provides a wider bandwidth with relaxed processing tolerance in selecting width or length. The directional coupler made with wider waveguide for both arms provides improved polarization splitting extinction ratio (ER) while allowing shorter length to the waveguide accordingly. With a shorter length in each directional coupler, a simple yet robust design of a compact PBS is made by cascading two-stage directional couplers with total length comparable to other state-of-art PBS. Additionally, by adjusting the gap distance between two arms of each directional coupler in each stage, the pass-band of PBS can be optimized flexibly for lower C-band in first-stage or upper C-band in second-stage so that a widened overall bandwidth with improved ER >25 dB is achieved on SOI integrated PIC systems.

The present invention achieves these benefits and others in the context of known polarization beam splitting technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
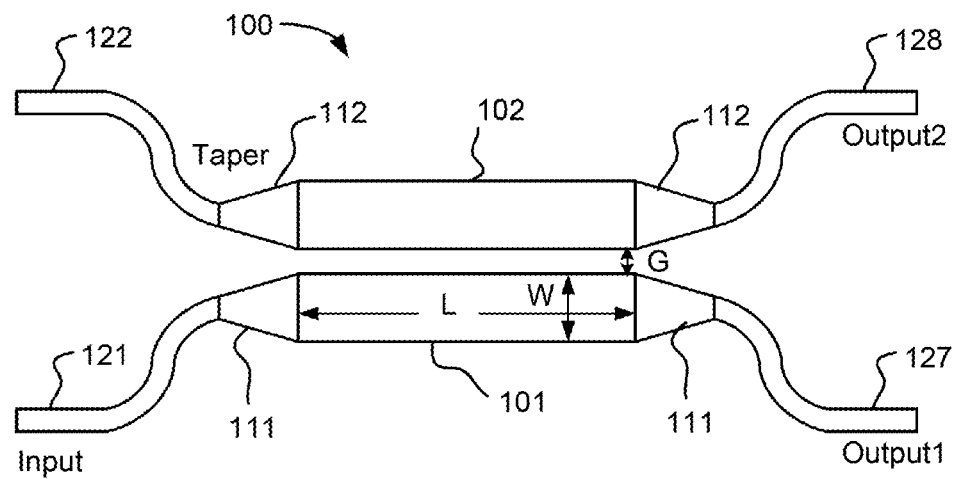
FIG. 1 is a simplified diagram of a silicon nitride waveguide-based directional coupler according to an embodiment of the present invention.

The present invention relates to photonic broadband communication device. More particularly, the present invention provides a broadband polarization beams splitter (PBS) based on silicon nitride waveguide. Merely by example, the present invention discloses a compact PBS using two-stage directional coupler with wider waveguides and complimentary designed gaps for achieving high extinction ratio and low insertion loss for integration in photonic integrated circuits (PIC) over C-band, though other applications are possible.

Waveguide based polarization beam splitter (PBS) is one of the essential photonic devices in coherent optical communication systems, sensing, optical signal processing, planar lightwave circuits, and other areas whenever a single-polarization operation or the polarization diversity is required. There has been a variety of designs/implementations of integrated optic polarization splitters in the literature, among which the directional coupler (DC) may be the most commonly used platform because of its easy design. For example, a conventional DC structure using silicon-on-insulator (SOI) waveguides can be made as small as less than 10 μm in length and 0.2 to 0.4 μm in width and thickness. In principle, polarization splitting is achieved by utilizing the modal birefringence inherent in optical waveguides. In the conventional design, TE (transverse electric) polarization has a much longer coupling length than TM (transverse magnetic) polarization so that TE polarization goes through with very slight coupling while TM polarization is cross-coupled completely. However, the slight evanescent coupling for TE polarization prevents to achieve a high extinction ratio. Besides, the bandwidth of the PBS based on a single-stage Si-waveguide directional coupler is not sufficient for covering entire C-band.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram of a silicon nitride waveguide-based directional coupler according to an embodiment of the present invention. This diagram is merely an example, which should not unduly limit the scope of the claims. One of ordinary skill in the art would recognize many variations, alternatives, and modifications. As shown, a directional coupler 100 is formed with two planar waveguide branches 101 and 102 disposed in parallel near each other separated by a gap distance G. Each waveguide branch 101 or 102 is made by a length L and width W (and thickness not explicitly shown) of silicon nitride ($Si_3N_4$) material with high refractive index of about 2.0, from which a coupling length of either a TE or TM polarization mode can be determined. The waveguide branch 101 includes an input port 121 and a first output port 127, both being made respectively by silicon nitride planar waveguides with a smaller width coupled to the branch 101 by a taper section 111. The other waveguide branch 102 includes a coupled port 122 and a second output port 128, both also being made respectively by silicon nitride planar waveguides with a smaller width coupled to the branch 102 by another taper section 112. In an embodiment, the silicon nitride planar waveguide is a segment of silicon nitride thick film having a length L and a width W.

In an embodiment, the input port 121 is configured to receive an optical signal including mixed TE and TM polarization modes over an operation band of frequencies, for example, the whole C-band. The optical signal is then fed from the input waveguide with a narrower width through the taper section 111 into a first end of the waveguide branch 101. In a specific embodiment, each waveguide branch 101 and 102 is configured to set its length L to be comparable with a coupling length for the TE polarization mode in the optical signal which is 2× of the coupling length for the TM polarization mode. This configuration allows separation of the TE and TM polarization modes of the input optical signal as the TE mode after just traveling the length L (of the two waveguide branches) is substantially cross-coupled completely from the waveguide branch 101 to the nearby waveguide branch 102 and exits at Output2 port 128. At the same time, the TM mode after traveling the length L will be cross-coupled completely twice from branch 101 to 102 then back to 101, so TM mode substantially exits at the through port, Output1 port 127. Thus in principle, the directional coupler 100 according to an embodiment of the present invention is configured to set its coupling length for splitting an input optical signal in one of frequency in C-band with mixed TE and TM polarizations to two single-mode outputs, one output at a cross port (Output2) 128 bearing substantially TE polarization mode with a TE extinction ratio and another output at a through port (Output1) 127 bearing substantially TM polarization mode with a TM extinction ratio. Both TE and TM mode extinction ratio can be as high as 20 dB. Of course, the mode coupling is 100% complete so that the through port (Output1) 127 may still contain a minor portion of TE mode while the cross port (Output2) 128 may contain a minor portion of TM mode.

Additionally, the frequency response of TE/TM coupling of the directional coupler 100 may not be completely uniform across the whole C-band as the coupling length is a function of wavelength. As the result, the TE/TM mode extinction ratio (ER) varies with the different wavelengths in the C-band. For example, the ER may be as high as 30 dB in a smaller window of C-band near 1535 nm and drops to below 15 dB for other wavelengths in a wider range of C-band. On the other hand, the coupling length of the directional coupler 100 is also a function of coupling gap G between the two parallel waveguide branches 101 and 102. For the directional coupler (DC) structure with simple straight waveguide branches, even and odd DC super mode effective indices ($n_{even}$ and $n_{odd}$) for both TE and TM polarization modes can be calculated at varying coupling gaps G and waveguide widths W. By varying the coupling gap G, the frequency response of TE/TM coupling can be adjusted. In a specific embodiment, a nominal value of the coupling gap is selected around 0.5 µm and the waveguide width is selected to be 1.6 µm or greater. Accordingly, the waveguide length L of the directional coupler 100 configured for operation in C-band is about 145 µm or smaller while the input/output port waveguide and the taper sections can be made in much shorter lengths. More detail descriptions about the polarization mode splitting over complete C-band being affected by the coupling gap of the two DC waveguide branches will be seen throughout the specification and particularly below. Alternatively, the present invention is applicable to be best fit for other frequency band such as L-band or S-band by re-adjusting the waveguide length and width as well as the coupling gap between two branches.

Figure 2:
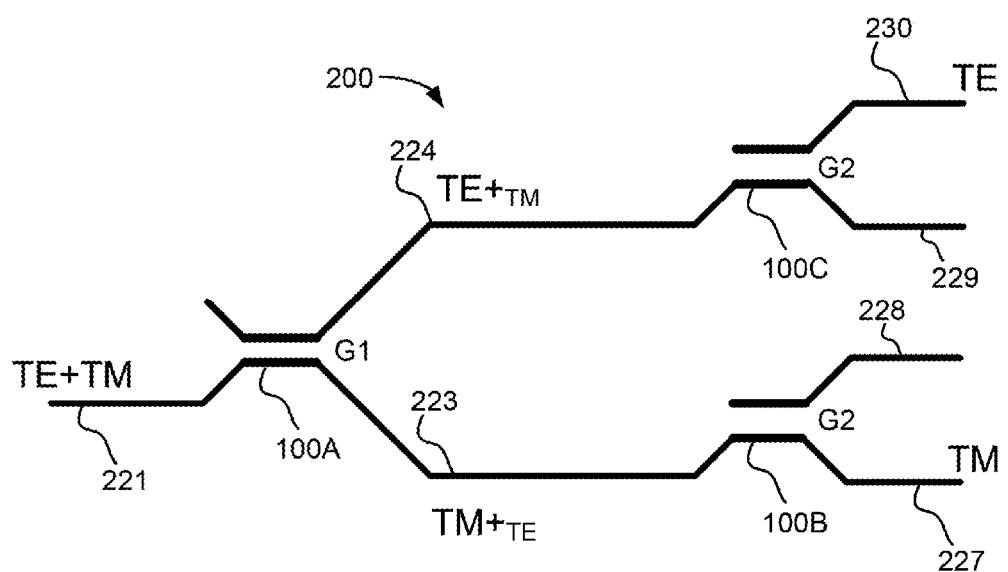
FIG. 2 is a simplified diagram of a polarization beam splitter (PBS) by cascading two stages of silicon nitride waveguide-based directional couplers according to an embodiment of the present invention.

FIG. 2 is a simplified diagram of a polarization beam splitter (PBS) by cascading two stages of silicon nitride waveguide-based directional couplers according to an embodiment of the present invention. This diagram is merely an example, which should not unduly limit the scope of the claims. One of ordinary skill in the art would recognize many variations, alternatives, and modifications. As shown, the PBS 200 is formed by cascading two stages of directional couplers that are similarly configured to the directional coupler 100 shown in FIG. 1 but with complementary design in coupling gap selection for respectively optimizing polarization splitting in two stages with enhanced ER in broader window of wavelength band. In particular, the PBS 200 includes one first-stage directional coupler 100A and two second-stage directional couplers 100B and 100C having respective input ports connected to two output ports of the first-stage directional coupler 100A.

In a specific embodiment, the first-stage directional coupler 100A is associated with a first coupling gap G1 and the two second-stage directional couplers 100B and 100C are configured to be substantially the same as the first-stage directional coupler 100A but associated with a coupling gap G2. The first coupling gap G1 is configured to be smaller or greater than the second coupling gap G2 such that the first-stage directional coupler 100A is optimized on polarization splitting with a first stage high TE or TM extinction ratio (ER) of >20 dB substantially over a lower or upper range of C-band while each of the second-stage directional couplers 100B and 100C is complementary optimized on polarization splitting with an additional second stage high TE or TM ER of >20 dB substantially over an upper or lower range of the C-band.

In another specific embodiment, the ER wavelength-dependency optimization for the first/second-stage directional couplers is performed by respectively tuning the coupling gap G1/G2 around a nominal value substantially corresponding to an optimized ER at middle point of the C-band. A narrower coupling gap (e.g. a G1 value smaller than the nominal value) results in a shorter wavelength window of high-ER polarization splitting. A wider coupling gap (e.g., a greater G2 than the nominal value) results in a longer wavelength window with high-ER polarization splitting. In the embodiment for operating the PBS 200 in C-band, the nominal value for the coupling gap is about 0.5 μm associated a maximum ER value at a middle wavelength of C-band. Then, a complimentary design of the two-stage directional couplers is to set the first coupling gap G1 to be <0.5 μm and the second coupling gap G2 to be >0.5 μm or vise versa. Since all waveguides of the directional couplers in the cascaded PBS 200 are made by $Si_3N_4$ material with much higher refraction index than $SiO_2$ substrate, the coupling gap G1 or G2 is less sensitive to affect the coupling length for optimizing the high-ER wavelength window. Thus cascading two-stage DCs actually have fairly large manufacturing tolerance. This makes the process for making the compact PBS with high extinction ratio very robust for integration PIC in C-band.

Referring again to the FIG. 2, as configured similarly as the directional coupler 100, the first-stage directional coupler 100A allows an incoming optical signal with mixed TE and TM mode over the whole C-band received at input port 221 to be split to two parts based on the TE and TM polarization modes due to a proper design of making a coupling length for TE mode signal 2× of a coupling length for TM mode. Thus, one part with primarily TE mode and minor TM mode is coupled to a first cross port 224 of a different branch and another part with primarily TM mode and minor TE mode is coupled (or cross-coupled twice) in the a first through port 223 of the same branch as the input port 221.

Additionally, each of the second-stage directional coupler (DC) 100B is configured substantially similar as the first-stage directional coupler 100A. The output signal of the first-stage directional coupler 100A with primary TM mode at a through port 223 with a first-stage TM extinction ratio becomes an input of a first second-stage directional coupler 100B through which the TM mode is substantially coupled to a corresponding second through port 227 with an additional second-stage TM extinction ratio. The minor TE mode in port 223 is substantially coupled to a cross port 228 of DC 100B. The output signal of the first-stage directional coupler 100A with primary TE mode at a first cross port 224 with a first-stage TE extinction ratio becomes an input of a second second-stage directional coupler (DC) 100C through which the TE mode is further substantially cross-coupled to a second cross port 230 with an additional second-stage TE extinction ratio. The minor TM mode is substantially dropped to a through port 229 of DC 100C.

Figure 3:
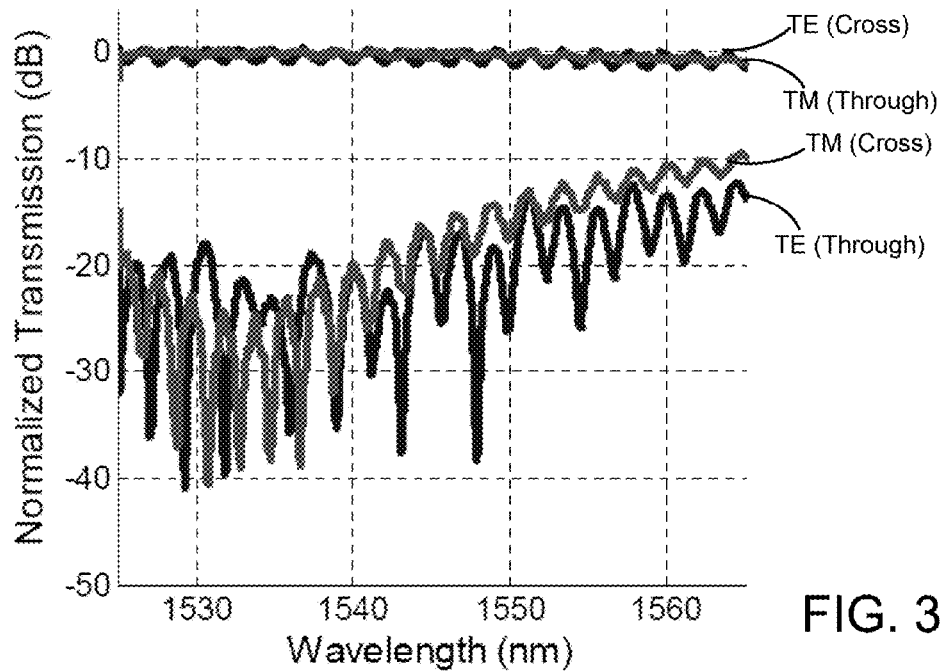
FIG. 3 is an exemplary plot of normalized transmission measured on a first-stage directional coupler in the PBS of FIG. 2 according to an embodiment of the present invention.

FIG. 3 is an exemplary plot of normalized transmission measured on a first-stage directional coupler in the PBS of FIG. 2 according to an embodiment of the present invention. This diagram is merely an example, which should not unduly limit the scope of the claims. One of ordinary skill in the art would recognize many variations, alternatives, and modifications. Provided a first-stage directional coupler (100A) with an optimized coupling gap G1, a normalized transmission is measured and plotted against wavelengths across entire C-band. As shown, the transmission power loss for the signal bearing TE polarization mode is very small (<1 dB) at a cross port but quite large at a through port varied in a range from about 25 dB in a shorter wavelength window of 1530-1535 nm to about 15 dB in a longer wavelength window of 1550-1565 nm. Effectively this yields a first-stage TE extinction ratio varied similarly across the C-band.

At the same time, the transmission power loss for the signal bearing TM polarization mode is very small (<1 dB) at the through port 223 but quite large at the cross port 224 varied in a range from about 25 dB in a shorter wavelength window of 1530-1535 nm to about 12 dB or smaller in a longer wavelength window of 1550-1565 nm. Effectively, this yields a first-stage TM extinction ratio varied as described across the C-band. In other words, referring to FIG. 2, the TE mode portion of the optical signal received at the input port 221 is substantially coupled to the cross port 224 and the TM mode portion of the optical signal is substantially coupled to the through port 223 and the splitting of originally mixed TE and TM modes is achieved by the first-stage directional coupler 100A with first-stage TE or TM extinction ratio up to 25 dB optimized at least in a lower range of C-band.

Figure 4:
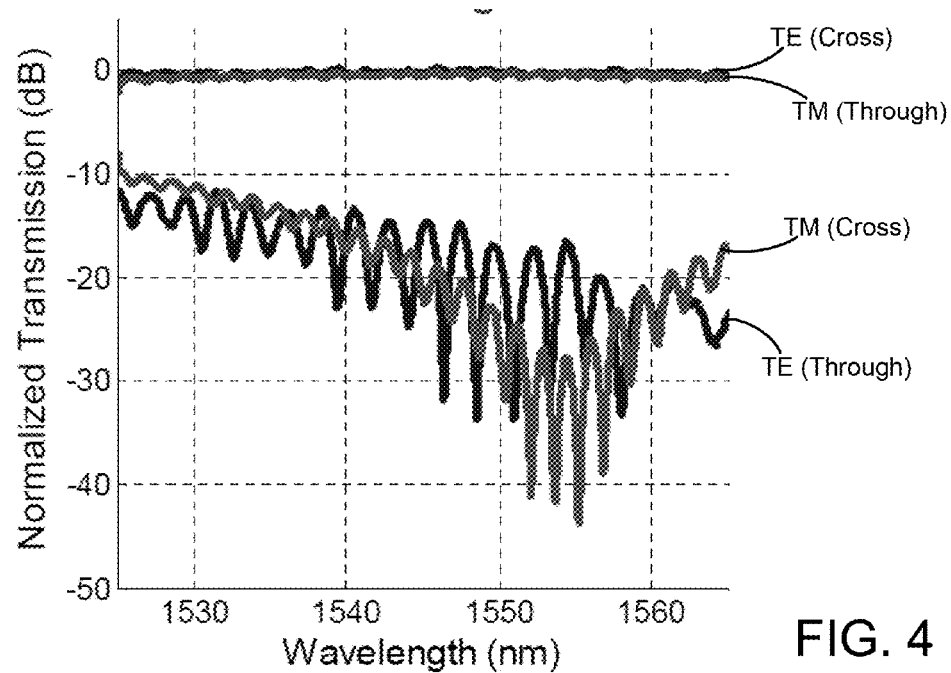
FIG. 4 is an exemplary plot of normalized transmission measured on a second-stage directional coupler in the PBS of FIG. 2 according to an embodiment of the present invention.

FIG. 4 is an exemplary plot of normalized transmission measured on a second-stage directional coupler in the PBS of FIG. 2 according to an embodiment of the present invention. This diagram is merely an example, which should not unduly limit the scope of the claims. One of ordinary skill in the art would recognize many variations, alternatives, and modifications. Provided a second-stage directional coupler (100B or 100C) with an optimized coupling gap G2, a normalized transmission is measured and plotted against wavelengths across entire C-band. As shown, the transmission power loss for a TE polarization mode signal is very small (<1 dB) at a cross port but quite large at a through port varied in a range from about 12 dB-15 dB in a shorter wavelength window of 1530-1540 nm to about 20 dB in a longer wavelength window of 1550-1565 nm. This yields a second-stage TE extinction ratio for the C-band. At the same time, the transmission power loss for a TM polarization mode signal is very small (<1 dB) at the through port but quite large at the cross port varied in a range from about 11 dB-13 dB in a shorter wavelength window of 1530-1535 nm to about 25 dB in a longer wavelength window of 1550-1557 nm. Again, a second-stage TM extinction ratio for the C-band is provided.

Referring to the second-stage DC 100B in FIG. 2, its input includes primarily TM mode portion and minor TE mode portion from the first through port 223 with high first-stage TM ER optimized in lower range of C-band. The DC 100B is configured to further split the primarily TM mode portion and minor TE mode portion by coupling the TM mode to the second through port 227 with a high second-stage TM ER optimized in upper range of C-band while cross-coupling the minor TE mode to the cross port 228 of DC 100B. Similarly, referring to the second-stage DC 100C in FIG. 2, its input includes primarily TE mode portion and minor TM mode portion from the first cross port 224 with high first-stage TE ER optimized in lower range of C-band and is further split by coupling the minor TM mode to the through port 229 of DC 100C and cross-coupling the primary TE mode portion to the second cross port 230 with high second-stage TE ER optimized in upper range of C-band. In an alternative embodiment, the complementary design of the two stages of DCs can choose to set the first coupling gap for optimizing the first-stage DC with maximum ER at upper range of C-band while to set the second coupling gap for optimizing the second-stage DC with maximum ER at complementary lower range of C-band.

Figure 5:
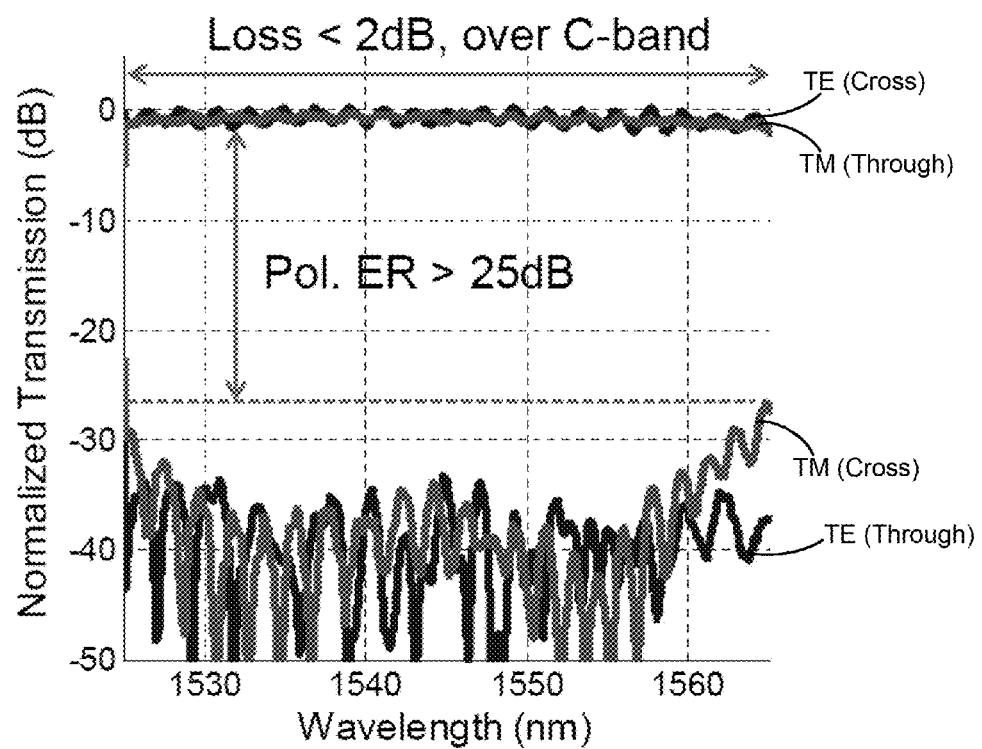
FIG. 5 is an exemplary plot of normalized transmission measured on the PBS of FIG. 2 according to an embodiment of the present invention.

FIG. 5 is an exemplary plot of normalized transmission measured on the PBS made by cascading two stages of directional couplers (DCs) of FIG. 2 according to an embodiment of the present invention. This diagram is merely an example, which should not unduly limit the scope of the claims. One of ordinary skill in the art would recognize many variations, alternatives, and modifications. As shown, when both the first-stage DC 100A and two second-stage DCs 100B and 100C are configured with complementary coupling gap optimization of high ER wavelength windows respectively for lower and upper range of C-band or vise versa, polarization splitting with a final TE/TM ER of greater than 25 dB is achieved over entire C-band while retaining very low insertion loss (<2 dB) for either the TE mode signal in the second cross port 230 or the TM mode signal in the second through port 227.

In principle, a final TE or TM extinction ratio is equal to a sum of a first-stage TE or TM extinction ratio defined by the primary TE mode portion in the first cross port 224 over the minor TE power in the first through port 223, or the primary TM mode portion in the first through port 223 over the minor TM power in the first cross port 224, and a second-stage TE or TM extinction ratio associated with each second-stage directional coupler. In certain embodiment of the present invention, the first-stage extinction ratio is optimized near a lower range of C-band and the second-stage extinction ratio is optimized near an upper range of C-band. The final extinction ratio of the PBS is more uniformly improved across complete range of C-band.

Although cascading two stages of DCs with optimized coupling gap increases the total length of the PBS, but the length of each DC plus its input/output waveguide and taper portions is merely about 150 μm, still making this PBS a compact one but with substantially improved extinction ratio for complete C-band. Furthermore, the DC used in each stage is made by $Si_3N_4$ material with high manufacture tolerance in terms of selections of waveguide width and coupling gap at a minimum waveguide length to obtain a desired coupling length for achieving high TE/TM polarization extinction in desired complementary wavelength windows. Thus, such cascading process for making a compact broadband PBS with high ER is very robust for integration PIC at entire C-band.

In an alternative embodiment, the present invention also provides a method for forming a compact polarization beam splitter. The method includes making a first-stage directional coupler including two waveguides laid in parallel separated by a first coupling gap and configured to have a coupling length for TE polarization mode to be twice of a coupling length for TM polarization mode. The two waveguides are made by silicon nitride material formed on a SOI wafer. One of the two waveguides includes an input port for receiving an optical signal selected from a designated wavelength band with mixed TE and TM polarization modes. The first-stage directional coupler is configured to split the optical signal to two parts. One part containing primary TM mode limited by a first-stage TM extinction ratio is passed to a first through output port of the same waveguide connected to the input port. Another part containing primary TE mode limited by a first-stage TE extinction ratio is cross-coupled to a first cross port of another one of the two waveguides with the first cross output port being sided with the first through port separated by the first coupling gap. The method additionally includes tuning the first coupling gap to be smaller or greater than a nominal value for optimizing the first-stage TE or TM extinction ratio to achieve higher values in a shorter or longer wavelength window of the designated wavelength band.

The method for forming a compact polarization beam splitter further includes cascading two second-stage directional couplers respectively to two output ports of the first-stage directional coupler. Each of the two second-stage directional couplers are also made by silicon nitride material on SOI wafer and configured to be substantially the same as the first-stage directional coupler except that the two waveguides are laid in parallel with a separation of a second coupling gap greater than the first coupling gap. In particular, the first through output port of the first-stage directional coupler becomes an input port of a first second-stage directional coupler and the first cross output port of the first-stage directional coupler becomes another input port of a second second-stage directional coupler. The first second-stage directional coupler is configured to further couple the TM mode from corresponding input port (i.e., the first through output port) with a second-stage TM extinction ratio to a second through output port. The second second-stage directional coupler is configured to further cross-couple the TE mode from corresponding another input port (i.e., the first cross output port) with a second-stage TE extinction ratio to a second cross output port.

In a specific embodiment, the formation of the second-stage directional coupler can be performed on the same SOI wafer for forming the first-stage directional coupler. Cascading the two stages directional couplers is a seamless single process of forming several integrated $Si_3N_4$ waveguides on a SOI wafer.

Furthermore, the method for forming a compact polarization beam splitter includes tuning the second coupling gap to be complementary of the first coupling gap. Therefore, each of the second-stage directional couplers can be optimized to obtain maximum second-stage TE or TM extinction ratio in a longer or shorter wavelength window of the designated wavelength band that is complementary to the shorter or longer wavelength window optimized for the first-stage directional coupler. The final polarization splitting extinction ratio for TE or TM mode is obtained by summing the first-stage extinction ratio and the second-stage extinction ratio over entire range of the designated wavelength band.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A broadband communication system comprising:
   a polarization beam splitter, the polarization beam splitter comprising:
   a first-stage directional coupler comprising a first waveguide and a second waveguide laid in parallel with a first coupling gap and configured to have a coupling length for TE polarization mode be twice of that for TM polarization mode, the first waveguide being configured with an input port for receiving an optical signal over a predetermined wavelength band and a first through port for outputting a first primary TM mode portion of the optical signal with a first TM extinction ratio, the second waveguide being configured to have a first cross port for outputting a first primary TE mode portion of the optical signal cross coupled from the input port of the first waveguide with a first TE extinction ratio;

a couple of second-stage directional couplers each being configured substantially same as the first-stage directional coupler except being complementary designed with a second coupling gap, a first second-stage directional coupler being cascaded to the first through port for further coupling the first primary TM mode portion to a second primary TM mode portion at a second through port with a second TM extinction ratio and a second second-stage directional coupler being cascaded to the first cross port for further cross-coupling the first primary TE mode portion to a second primary TE mode portion at a second cross port with a second TE extinction ratio;

wherein the first and second coupling gap are set complementary for maximizing the first and second TE/TM extinction ratio respectively within a shorter and longer wavelength window of the predetermined wavelength band or vice versa; and a network.

2. The system of claim 1 wherein each of the two waveguides in each of the first-stage directional coupler and the second-stage directional coupler is made by silicon nitride material formed on an SOI wafer.

3. The system of claim 2 wherein each of the two waveguides comprises a length of about 145 microns or shorter and a width of about 1.6 microns or greater for setting the length comparable to the coupling length for the TE polarization mode.

4. The system of claim 3 the first coupling gap is tuned to be smaller or greater than a nominal gap value and the second coupling gap is complementary tuned to be greater or smaller than the nominal gap value, the nominal gap value corresponding to a maximum value of the first/second TE/TM extinction ratio at about a middle wavelength of the predetermined wavelength band.

5. The system of claim 4 wherein the nominal gap value is about 0.5 microns.

6. The system of claim 1 wherein the first waveguide is configured to have a first end connected directly to the input port with a smaller width via a taper section and a second end connected directly to the first through port with a smaller width via another taper section, while the second waveguide is configured to have at least a third end connected directly to the first cross port via another taper section, the third end being in parallel sided with the second end having a separation of the first coupling gap.

7. The system of claim 6 wherein the first through port is an input port of the first second-stage directional coupler and the first cross port is an input port of the second second-stage directional coupler.

8. The system of claim 1 wherein the predetermined wavelength band is C-band defined in 1530-1565 nm.

9. The system of claim 1 wherein the first cross port comprises a first minor TM mode portion that has a power level at least 13 dB lower than the first primary TE mode portion across the predetermined wavelength band.

10. The system of claim 1 wherein the first through port comprises a first minor TE mode portion that has a power level at least 13 dB lower than the first primary TM mode portion across all wavelengths in the predetermined wavelength band.

11. The system of claim 1 wherein the second TE/TM mode portion comprising an overall TE/TM extinction ratio in that is equal to the first TE/TM extinction ratio plus the second TE/TM extinction ratio, the overall TE/TM extinction ratio being substantially greater than 25 dB over all wavelengths in the predetermined wavelength band.

12. A system comprising:
a compact polarization beam splitter comprising, the compact polarization beam splitter comprising:
a first directional coupler comprising two waveguides in parallel separated by a first gap and configured to split an optical signal of a wavelength band received by an input port of one waveguide with a TE polarization mode portion being substantially cross-coupled once to a first cross output port of another waveguide while a TM polarization mode portion being substantially cross-coupled twice back to a first through output port of the same waveguide;
a second directional coupler and a third directional coupler respectively cascaded to the first cross output port and the first through output port of the first directional coupler, each of the second and third directional couplers comprising two waveguides in parallel separated by a second gap and configured to split TE and TM polarization mode the same way as the first directional coupler for further cross-coupling the TE polarization mode portion once to a second cross output port of the second directional coupler and cross-coupling the TM polarization mode portion twice to a second through output port of the third directional coupler;
wherein the first gap is set to maximize transmission of the TE/TM polarization mode portion respectively at the first cross/through output port at least over a shorter or longer wavelength window of the wavelength band and the second gap is set to maximize transmission of the TE/TM polarization mode portion respectively at the second cross/through output port at least over a complementary longer or shorter wavelength window of the wavelength band; and
a network.

13. The system of claim 12 wherein each waveguide is made from a segment of silicon nitride material formed as a thick film having a length and a width on a SOI wafer.

14. The system of claim 12 wherein the wavelength band for operation is a full range of C-band from 1530 nm to 1565 nm.

15. The system of claim 14 wherein the first gap is selected to be smaller or greater than 0.5 μm for configuring the first directional coupler having two waveguides of 145 μm or smaller in length and 1.6 μm or greater in width to achieve better than 20 dB TE/TM extinction ratio in a lower or upper range of C-band.

16. The system of claim 14 wherein the second gap is selected to be greater or smaller than 0.5 μm for configuring the first directional coupler having two waveguides of 145 μm or smaller in length and 1.6 μm or greater in width to achieve better than 20 dB TE/TM extinction ratio in an upper or lower range of C-band.

17. The system of claim 12 further comprising a TE/TM polarization extinction ratio greater than 25 dB and an insertion loss less than 0.2 dB measured at the second cross/through output port for the optical signal over a full range of C-band.

\* \* \* \* \*